United States Patent
Fukumoto et al.

(10) Patent No.: US 7,151,132 B2
(45) Date of Patent: Dec. 19, 2006

(54) PRESSURE SENSITIVE ADHESIVE COMPOSITION AND SHEET

(75) Inventors: Shouichi Fukumoto, Tokyo (JP); Hiroyuki Iida, Tokyo (JP)

(73) Assignee: Toyo Ink Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/981,809

(22) Filed: Nov. 5, 2004

(65) Prior Publication Data

US 2005/0101720 A1    May 12, 2005

(30) Foreign Application Priority Data

Nov. 7, 2003    (JP) .............................. 2003-377966

(51) Int. Cl.
*C08L 31/02*    (2006.01)

(52) U.S. Cl. ...................... 524/556; 524/558; 524/589; 427/208.4

(58) Field of Classification Search ................ 524/550, 524/556, 558, 589; 427/208.4; 260/24
See application file for complete search history.

(56) References Cited

U.S. PATENT DOCUMENTS

| | | | |
|---|---|---|---|
| 3,880,813 A * | 4/1975 | Guse et al. ................. | 526/321 |
| 4,087,392 A * | 5/1978 | Hartmann et al. .......... | 524/270 |
| 4,113,792 A * | 9/1978 | Pastor et al. ................ | 525/155 |
| 4,988,742 A * | 1/1991 | Moon et al. ................. | 522/79 |
| 5,141,989 A * | 8/1992 | Jung et al. .................. | 524/561 |
| 5,284,908 A * | 2/1994 | Fujiwara et al. ............ | 524/718 |
| 6,630,239 B1 * | 10/2003 | Cernohous et al. ..... | 428/355 R |

FOREIGN PATENT DOCUMENTS

| | | |
|---|---|---|
| JP | 2-232279 | 9/1990 |
| JP | 11-197501 | 9/1990 |

* cited by examiner

*Primary Examiner*—Ling-Sui Choi
(74) *Attorney, Agent, or Firm*—Heslin Rothenberg Farley & Mesitit P.C.

(57) ABSTRACT

A pressure sensitive adhesive composition comprising a copolymer and an isocyanate compound, without a substantial amount of a halogen compound, the copolymer being prepared by copolymerizing radical-polymerizable monomers essentially containing a radical-polymerizable monomer with a carboxyl group, using at least one chain transfer agent selected from a group consisting of α-pinene, limonene, and terpinolene, in the presence of at least one organic solvent selected from a group consisting of ethyl acetate, acetone, methyl ethyl ketone, and methyl isobutyl ketone, but in the absence of toluene, is disclosed.

4 Claims, No Drawings

PRESSURE SENSITIVE ADHESIVE COMPOSITION AND SHEET

BACKGROUND OF THE INVENTION

1. Field of the Invention

The present invention relates to a pressure sensitive adhesive composition, and a pressure sensitive adhesive sheet. More particularly, the present invention relates to a pressure sensitive adhesive composition meeting a social demand, that is, a pressure sensitive adhesive composition not containing toluene or a halogen compound.

2. Description of the Related Art

In a field of organic solvent-type pressure sensitive adhesive compositions, a compound having isocyanate groups is conventionally used as a curing agent for copolymers prepared by copolymerizing radical-polymerizable monomers. In this case, the polymers as a base component are often polymerized in the presence of toluene. Toluene acts not only as a solvent for the monomers used, and the resulting polymers, but also as a chain transfer agent in the polymerization. After the polymerization, in many cases toluene is also used as a diluent for adjusting the viscosity. However, from an environmental standpoint a pressure sensitive adhesive composition not containing toluene is now desired.

Thus, the present inventors attempted to obtain a pressure sensitive adhesive composition by using copolymers prepared by polymerizing radical-polymerizable monomers in the presence of an organic solvent (such as ethyl acetate) other than toluene. However, a weight average molecular weight or a number average molecular weight of the resulting copolymer prepared by polymerizing an organic solvent other than toluene is increased in comparison with those of the copolymer prepared by using toluene. As a result, in comparison with the conventional pressure sensitive adhesive composition containing the polymers polymerized in the presence of toluene, the pressure sensitive adhesive composition containing the polymers polymerized in the organic solvent other than toluene has a greater viscosity, under the condition that the solid content is same as that of the conventional composition, and thus the coating property is remarkably lowered. The coating property can be improved by lowering the solid content during the polymerizing step or by dilution after polymerization. If the coating property is enhanced as above, however, only an adhesive sheet having a lowered adhesive strength or tackiness can be obtained.

Generally, an isocyanate group exhibits a high reactivity with a compound having hydroxyl or amino groups. Therefore, an isocyanate compound is often used as a curing agent for a base component, in a composition containing a compound with hydroxyl or amino groups as the base component.

Further, in the field of organic solvent-type pressure sensitive adhesive compositions containing an isocyanate compound, not only the compound with hydroxyl or amino groups, but also a compound with carboxyl groups is conventionally used as the base component of the pressure sensitive adhesive composition. An isocyanate compound is also often used as a curing agent for the base component having carboxyl groups.

An isocyanate compound used as the curing agent is highly reactive. Therefore, after it is mixed with the base component, it is easily reacted with water contained in the organic solvent or air. When the isocyanate compound is reacted with water contained in the organic solvent or air, an insoluble product is formed, and thus a pressure sensitive adhesive composition becomes white and turbid. The present inventors found that such a white and turbid pressure sensitive adhesive composition resulted in only an adhesive sheet with poor adhesive properties, and that this tendency was pronounced when the base component having carboxyl groups without a hydroxyl or amino groups was used.

The time wherein the coating properties or properties of an adhered article or an adhesive sheet are not affected after a curing agent is mixed with a base component is generally called a "pot life". It is very important to make the pot life as long as possible. Although a required or allowable pot life is different among companies manufacturing an adhered article or an adhesive sheet which actually carry out coating and drying processes, it is generally required that the appearance and properties of a pressure sensitive adhesive composition and properties of an adhered article or an adhesive sheet do not change for at least two hours after a curing agent is added.

Therefore, in order to lengthen the pot life, a halogen compound is generally added to a pressure sensitive adhesive composition as a moisture trapping agent for water contained in an organic solvent or moisture in air. However, from an environmental standpoint a pressure sensitive adhesive composition without a halogen compound is now desired. That is, a pressure sensitive adhesive composition which does not contain a halogen compound, but has a pot life the same as or longer than that of a pressure sensitive adhesive composition containing a halogen compound is desired.

An adhesive sheet carrying a pressure sensitive adhesive composition is widely used in various applications. For example, in the case of a pressure sensitive adhesive composition for use as a building material, a part of household electrical equipment, wallpaper, or the like, the pressure sensitive adhesive composition remains on the adhered articles in a room of a house. In these cases, some components contained in the pressure sensitive adhesive composition may vaporize and float in the air of the room. The substance which may vaporize includes formaldehyde, toluene, or the like, and such chemical substances are regarded as a cause of the so-called "sick-house" syndrome. The "sick-house" syndrome can be prevented if a pressure sensitive adhesive composition not containing chemical substances which cause such a syndrome is used for the adhered article placed in a room.

Even if the substances which may cause "sick-house" syndrome are not used, however, formaldehyde is contained in air, and air may possibly be trapped in the pressure sensitive adhesive composition. Further, formaldehyde may be generated by heating. Thus, it is difficult to control formaldehyde.

Therefore, from an environmental standpoint an adhesive sheet prepared from a pressure sensitive adhesive composition not containing formaldehyde, and able to inhibit the generation of formaldehyde is desired.

As a method of decreasing formaldehyde, Japanese Unexamined Patent Publication No. 2-232279 discloses the use of a formaldehyde trapping agent selected from a group consisting of urea, acetyl acetone, and a combination of urea and a promoting agent selected from a group consisting of glyoxal and acetyl acetone, and Japanese Unexamined Patent Publication No. 11-197501 discloses the use of an aldehyde adsorbent agent comprising an active energy ray-curable resin containing an acetoacetyl group. Further, it is known to use urea, thiourea, ethylene urea, dicyanediamide, glyoxalmonourethane, amines, or amides as a trapping agent.

However, ureas are not soluble in a solvent-type pressure sensitive adhesive composition. Further, dicyanediamides or amines easily react with a base component of the solvent-type pressure sensitive adhesive composition, and thus, the pot life of the pressure sensitive adhesive composition is shortened when dicyanediamides or amines are used.

SUMMARY OF THE INVENTION

Accordingly, the object of the present invention is to provide a pressure sensitive adhesive composition which does not contain toluene or a halogen compound, while maintaining the adhesive properties and a pot life comparable to those of a conventional pressure sensitive adhesive composition.

Further, the object of the present invention is to decrease an amount of formaldehyde released from an adhesive sheet.

Other objects and advantages of the present invention will be apparent from the following description.

In accordance with the present invention, there is provided a pressure sensitive adhesive composition comprising a copolymer and an isocyanate compound, without a substantial amount of a halogen compound, the copolymer being prepared by copolymerizing radical-polymerizable monomers essentially containing a radical-polymerizable monomer with a carboxyl group, using at least one chain transfer agent selected from a group consisting of α-pinene, limonene, and terpinolene, in the presence of at least one organic solvent selected from a group consisting of ethyl acetate, acetone, methyl ethyl ketone, and methyl isobutyl ketone, but in the absence of toluene.

In accordance with a preferred embodiment of the present invention, there is provided the pressure sensitive adhesive composition wherein 0.001 to 5.0 parts by weight of the chain transfer agent is used with respect to 100 parts by weight of the radical-polymerizable monomers to prepare the copolymer.

In accordance with another preferred embodiment of the present invention, there is provided a pressure sensitive adhesive composition further comprising acetyl acetone.

In accordance with another aspect of the present invention, there is provided a pressure sensitive adhesive sheet comprising a substrate carrying on at least one surface thereof a layer of the pressure sensitive adhesive composition as above.

According to the present invention, a pressure sensitive adhesive composition which does not contain toluene or a halogen compound and exhibits adhesive properties and a pot life comparable to those of a conventional pressure sensitive adhesive composition can be provided.

Further, according to the pressure sensitive adhesive composition of the present invention further comprising acetyl acetone, an amount of formaldehyde released from an adhesive sheet can be reduced.

The present invention meets a demand for a toluene-free, halogen-free, and formaldehyde-free pressure sensitive adhesive composition.

DESCRIPTION OF THE PREFERRED EMBODIMENTS

When the copolymer, the base component, of the pressure sensitive adhesive composition of the present invention is polymerized, ethyl acetate, acetone, methyl ethyl ketone, or methyl isobutyl ketone is used alone or in combination thereof as a solvent instead of toluene. With respect to a reaction temperature, it is preferable to use ethyl acetate alone.

As mentioned in the "BACKGROUND OF THE INVENTION" of this specification, a weight average molecular weight of a copolymer and the like are increased only by copolymerizing radical-polymerizable monomers essentially containing a radical-polymerizable monomer with a carboxyl group in the presence of the organic solvent mentioned as above instead of toluene, in comparison with those of the copolymer prepared in the presence of toluene. As a result, a viscosity of the resulting pressure sensitive adhesive composition becomes higher, and the adhesive properties thereof are lowered. In the present invention, not only the above organic solvent other than toluene, but also at least one of α-pinene, limonene, or terpinolene is used as a chain transfer agent to obtain a copolymer having a weight average molecular weight and the like almost the same as those of the conventional copolymer prepared in the presence of toluene.

The molecular weight of the copolymer can be adjusted by an amount of the chain transfer agent such as α-pinene used. An amount of α-pinene or limonene is preferably 0.1 to 5.0 parts by weight, more preferably 0.3 to 3.0 parts by weight, most preferably 0.5 to 1.3 parts by weight, with respect to 100 parts by weight of the radical-polymerizable monomer. An amount of terpinolene is preferably 0.001 to 1.0 part by weight, more preferably 0.01 to 0.05 part by weight, with respect to 100 parts by weight of the radical-polymerizable monomer.

Terpinolene has an advantage in that a molecular weight of the copolymer can be adjusted with a small amount thereof, in comparison with α-pinene or limonene, whereas a slight change in an amount of terpinolene used exerts a great influence on the molecular weight. Therefore, it is preferable to use α-pinene or limonene in view of any weighing error or the like, and from a standpoint that a copolymer having constant properties can be reproducibly formed.

Limonene has a citrus fragrance, and although the fragrance is not an intense and distinctively unpleasant odor as a compound having a thiol group, it is preferable to use α-pinene than limonene when a scentless pressure sensitive adhesive composition is desired.

The copolymer which is a main component constituting the pressure sensitive adhesive composition of the present invention is not particularly limited so long as it contains a carboxyl group. The copolymer having carboxyl groups can be prepared by copolymerizing monomers comprising radical-polymerizable monomers with one or more carboxyl groups as an essential or indispensable component. The radical-polymerizable monomers with one or more carboxyl groups is, for example, (meth)acrylic acid.

Other monomers which can be copolymerized with the radical-polymerizable monomers having one or more carboxyl groups are, for example, a radical-polymerizable monomer having one or more hydroxyl groups, or other radical-polymerizable monomers without carboxyl or hydroxyl group. The radical-polymerizable monomer having one or more hydroxyl groups includes, for example, 2-hydroxyethyl (meth)acrylate, 4-hydroxybutyl(meth)acrylate or the like. Other radical-polymerizable monomer without a carboxylic group and a hydroxyl group includes 2-ethylhexyl (meth)acrylate, n-butyl(meth)acrylate, ethyl (meth)acrylate, methyl(meth)acrylate, (meth)acrylic acid, styrene, or the like.

When polymerized, a conventional polymerization initiator, such as a peroxide initiator or an azobis initiator, can be used.

An amount of the initiator used is preferably 0.05 to 1.0 part by weight, more preferably 0.15 to 0.5 part by weight, with respect to 100 parts by weight of the monomers.

A weight average molecular weight of the resulting copolymer is preferably 400 to 900 thousands, more preferably 500 to 750 thousands, as a converted value to polystyrene by a gel permeation chromatography. When the molecular weight becomes smaller, a heat-resistant property or a cohesive strength of the coated product will deteriorate. When the molecular weight becomes higher, an adhesive strength or a coating property will deteriorate.

Taking into account that the resulting copolymer is a base component of the pressure sensitive adhesive composition, a glass transition temperature required from the monomers used for copolymerization is preferably 0° C. to −80° C., more preferably −20° C. to −60° C.

An isocyanate compound which is a curing agent constituting the pressure sensitive adhesive composition of the present invention includes various polyisocyanate compounds, for example, various known aromatic, aliphatic, or cycloaliphatic diisocyanates.

As the aromatic diisocyanate, there may be mentioned, for example, 1,5-naphthylene diisocyanate, 4,4'-diphenyl-methane diisocyanate, 4,4'-diphenyldimethylmethane diisocyanate, tetraalkyldiphenylmethane diisocyanate, 1,3-phenylene diisocyanate, 1,4-phenylene diisocyanate, or tolylene diisocyanate.

As the aliphatic diisocyanate, there may be mentioned, for example, butane-1,4-diisocyanate, hexamethylene diisocyanate, isopropylene diisocyanate, methylene diisocyanate, 2,2,4-trimethyl hexamethylene diisocyanate, xylylene diisocyanate, m-tetramethyl xylylene diisocyanate, or dimer diisocyanate prepared by converting carboxyl groups of a dimer acid to an isocyanate group.

As the cycloaliphatic diisocyanate, there may be mentioned, for example, cyclohexane-1,4-diisocyanate, isophorone diisocyanate, lysine diisocyanate, dicyclohexyl-methane-4,4'-diisocyanate, 1,3-bis(isocyanatemethyl)-cyclohexane, methylcyclohexane diisocyanate, or norbornane diisocyanate.

An amount of the isocyanate compound used is preferably 1.0 to 5.0 parts by weight, more preferably 1.5 to 3.0 parts by weight, with respect to 100 parts by weight of the copolymer.

As mentioned in the "BACKGROUND OF THE INVENTION" of this specification, in the case of the conventional pressure sensitive adhesive composition containing an isocyanate compound, it was necessary to incorporate a halogen compound such as benzoly chloride as a water trapping agent, to inhibit the reaction of the isocyanate compound and water.

On the contrary, when the carboxyl group-containing copolymer prepared in the presence of the chain transfer agent such as α-pinene and the organic solvent such as ethyl acetate instead of toluene is used, an unexpected secondary effect occurs in that a sufficient pot life can be obtained even if the pressure sensitive adhesive composition does not contain a halogen compound such as benzoly chloride.

The mechanism whereby the advantage as above can be obtained is not elucidated as yet, but can be supposed as follows:

Toluene is less hydrophilic than the above organic solvent such as ethyl acetate. Water in an organic solvent or moisture in air has a higher affinity to the isocyanate compound than to toluene. On the contrary, the above organic solvent such as ethyl acetate has a high hydrophilicity, and thus, water in an organic solvent or moisture in air has a higher affinity to the above organic solvent such as ethyl acetate than to the isocyanate compound. Therefore, when toluene is used as a solvent, it is necessary to use a moisture trapping agent. However, it is assumed that when the above organic solvent such as ethyl acetate is used, a sufficient pot life can be obtained without the use of a moisture trapping agent.

The present invention is not limited by the above assumption.

The pressure sensitive adhesive composition of the present invention can be used to produce adhesive sheets for various applications and fields. For example, the pressure sensitive adhesive composition of the present invention can be preferably used for adhering parts of the interior or exterior equipment of a building, or parts of household electrical equipment. When the pressure sensitive adhesive composition of the present invention is used in an adhesive sheet placed in a room of a house after adhering, such as the interior or exterior equipment of a building, or household electrical equipment, the pressure sensitive adhesive composition of the present invention preferably contains acetyl acetone. The pressure sensitive adhesive composition containing acetyl acetone can decrease an amount of formaldehyde released from an adhesive sheet.

Acetyl acetone may be added or incorporated at any step in the method for producing the pressure sensitive adhesive composition of the present invention. For example, the pressure sensitive adhesive composition may be prepared by copolymerizing radical-polymerizable monomers in the presence of the organic solvent such as ethyl acetate and the chain transfer agent such as α-pinene, adding acetyl acetone to the resulting copolymer solution, and then adding the isocyanate compound thereto; or by copolymerizing radical-polymerizable monomers in the presence of the organic solvent such as ethyl acetate and the chain transfer agent such as α-pinene, and then adding the isocyanate compound together with acetyl acetone to the resulting copolymer solution. Alternatively, it is also possible to prepare the pressure sensitive adhesive composition by copolymerizing radical-polymerizable monomers in the presence of the organic solvent such as ethyl acetate, the chain transfer agent such as α-pinene, and acetyl acetone, and then adding the isocyanate compound. In each case, an amount of acetyl acetone used is preferably 0.01 to 2 parts by weight, more preferably 0.05 to 1 part by weight, with respect to 100 parts by weight of the base component, i.e., the copolymer. When the amount is less than 0.01 part by weight, an effect of trapping the formaldehyde becomes lower. When the amount is more than 2 parts by weight, the trapping property is enhanced. However, when the pressure sensitive adhesive composition is coated and dried on a substrate as mentioned below to obtain an adhesive sheet, acetyl acetone may remain in a layer of the pressure sensitive adhesive composition, and thereby lower the cohesion strength.

The pressure sensitive adhesive composition of the present invention may contain an additive which is incorporated in a conventional pressure sensitive adhesive composition, such as a filler, pigment, dyestuff, diluent, age inhibitor, polymerizing inhibitor, ultraviolet absorbing agent, or ultraviolet stabilizer. The above additive may be used alone or in combination thereof. The additive may be used in an amount sufficient to obtain the desired properties, and thus the amount is not limited.

The pressure sensitive adhesive composition of the present invention having the above constitution may be used in any application wherein a conventional pressure sensitive adhesive composition is used.

The pressure sensitive adhesive composition of the present invention may be used to prepare, for example, a pressure sensitive adhesive sheet, such as a pressure sensitive adhesive film, a pressure sensitive adhesive tape, a pressure sensitive adhesive label, a pressure sensitive adhesive plate, or a double-sided sticky tape.

A substrate for the above adhesive sheet is not limited and for example, plastic, such as polyethylene, polypropylene, polyester, polystyrene, polyethylene terephthalate (PET), polyvinyl chloride, polycarbonate, or cellophane; paper, such as wood free paper, kraft paper, crepe paper, or glassine paper; fabric, such as woven fabric or non-woven fabric may be used. A shape of the substrate is not limited and for example, a film, sheet, tape, or a plate may be used. The plastic substrate may be a foam.

A method for coating the substrate with the pressure sensitive adhesive composition, that is, a method for producing the adhesive sheet, is not limited, but may be one of various known methods. For example, a method comprising directly coating the substrate with the pressure sensitive adhesive composition, a method comprising coating a releasing paper with the pressure sensitive adhesive composition, and then transferring the pressure sensitive adhesive composition onto the substrate, or the like may be used. The pressure sensitive adhesive composition of the present invention is easily coated on the substrate.

An apparatus used for coating the substrate with the pressure sensitive adhesive composition is not limited.

A layer of the pressure sensitive adhesive composition can be formed by coating one side or both sides of the substrate with the pressure sensitive adhesive composition, and drying to integrate the substrate and the pressure sensitive adhesive composition. A drying temperature is not limited. A surface of an article to be adhered may be directly coated with the pressure sensitive adhesive composition, depending on the application.

Further, the adhesive sheet of the present invention may be prepared by coating a releasing paper with the pressure sensitive adhesive composition, applying the pressure sensitive adhesive composition layer to a surface of a sheet material such as a film, a tape, a label, or a plate, and remove the releasing paper from the pressure sensitive adhesive composition layer. A sheet material such as a film, a tape, a label, or a plate, having a surface to which a treatment to impart releasability has been subjected, may be used as a substrate for the adhesive sheet of the present invention. Further, a releasing paper may be applied on the pressure sensitive adhesive composition layer carried on such a releasing surface of the sheet material.

EXAMPLES

The present invention will now be further illustrated by, but is by no means limited to, the following Examples. In the following Examples, the term "part" denotes parts by weight and percentages (%) are given as percent by weight.

Example 1

In a polymerizing apparatus equipped with a stirrer, a thermometer, a dropping funnel, and a reflux condenser, 64.9 parts of butyl acrylate, 25 parts of 2-ethylhexyl acrylate, 7 parts of ethyl acrylate, 3 parts of acrylic acid, 0.1 part of hydroxyethyl acrylate, 120 parts of ethyl acetate, 0.85 part of α-pinene, and 0.03 part of benzoyl peroxide were copolymerized for 2 hours under reflux. While maintaining the reaction temperature, 0.023 part of benzoyl peroxide was added thereto after 1 hour and 2 hours, respectively. After the addition, the whole was reacted for 2 hours. Then, 0.022 part of t-butyloxy-2-ethyl hexanoate was added 1 hour, 2 hours and 3 hours later, respectively. After the last addition, the whole was reacted for further 2 hours. After cooling, the reaction product was diluted with ethyl acetate. After the liquid temperature became lower than 60° C., 0.1 part of hydroquinone derivative (Seiko Kagaku; Non-flex alber) was added, and then the whole was thoroughly agitated and a copolymer solution was taken out. A weight average molecular weight (converted value to polystyrene) of the resulting copolymer was analyzed by a gel permeation chromatography (GPC) and found to be about 650 thousands. A solid content of the copolymer solution was 45% and a viscosity thereof was 25000 mPa·s. To the solution containing 36 parts of the copolymer, 9 parts of a tackifier resin and ethyl acetate were added to obtain a solution having a solid content of 45% and a viscosity of 8000 mPa·s. To the solution, 0.1 part of acetyl acetone was added to obtain a base component of a pressure sensitive adhesive composition.

An amount of non-volatile components was determined from a difference between weights before and after drying in an electric oven at 150° C. for 20 minutes. The viscosity was measured by a Brookfield viscometer (#3 rotor, 12 rpm).

Example 2

The procedures disclosed in Example 1 were repeated, except that 0.8 part of limonene was used instead of α-pinene, to obtain an acrylic copolymer solution having a weight average molecular weight of about 650 thousands. Further, as in Example 1, a tackifier resin and ethyl acetate were added to the solution, to obtain a solution having a solid content of 45% and a viscosity of 8000 mPa·s. Then, 0.1 part of acetyl acetone was added to the solution, to obtain a base component of a pressure sensitive adhesive composition.

Example 3

The procedures disclosed in Example 1 were repeated, except that 0.025 part of terpinolene was used instead of α-pinene, to obtain an acrylic copolymer solution having a weight average molecular weight of about 650 thousands. Further, as in Example 1, a tackifier resin and ethyl acetate were added to the solution, to obtain a solution having a solid content of 45% and a viscosity of 8000 mPa·s. Then 0.1 part of acetyl acetone was added to the solution, to obtain a base component of a pressure sensitive adhesive composition.

Example 4

The procedures disclosed in Example 1 were repeated, except that acetyl acetone was not added, as it was in Example 1, to obtain a base component of a pressure sensitive adhesive composition.

Comparative Example 1

The procedures disclosed in Example 1 were repeated, except that 100 parts of ethyl acetate and 20 parts of toluene were used instead of 120 parts of ethyl acetate, and α-pinene was not used as it was in Example 1, to obtain an acrylic copolymer solution having a weight average molecular weight of about 630 thousands, a solid content of 45% and a viscosity of 25000 mPa·s.

To the solution containing 36 parts of the acrylic copolymer, 9 parts of a tackifier resin and ethyl acetate were added to obtain a solution having a solid content of 45% and a viscosity of 8000 mPa·s. Then 0.01 part of benzoyl chloride was added to the solution as a moisture trapping agent for elongating a pot life of a final pressure sensitive adhesive composition, to obtain a base component of the pressure sensitive adhesive composition.

Comparative Example 2

The procedures disclosed in Comparative Example 1 were repeated, except that benzoyl chloride as a moisture trapping agent was not added, to obtain a base component of the pressure sensitive adhesive composition.

Comparative Example 3

The procedures disclosed in Comparative Example 1 were repeated, except that toluene was not used as it was in Comparative Example, and only 120 parts of ethyl acetate were used as a polymerizing solvent, to obtain an acrylic copolymer solution (weight average molecular weight=about 950 thousands; solid content=45%).

Further, as in Comparative Example 1, 9 parts of a tackifier resin and ethyl acetate were added to the solution containing 36 parts of the copolymer, to obtain a solution having a solid content of 45% and a viscosity of 12000 mPa·s. Then 0.01 part of benzoyl chloride was added to the solution, as a moisture trapping agent for elongating a pot life of a final pressure sensitive adhesive composition, to obtain a base component of the pressure sensitive adhesive composition.

Comparative Example 4

The procedures disclosed in Comparative Example 3 were repeated, except that benzoyl chloride as a moisture trapping agent was not added, to obtain a base component of the pressure sensitive adhesive composition.

Preparation of Pressure Sensitive Adhesive Compositions

To each of 100 parts of the pressure sensitive adhesive compositions prepared in Examples and Comparative Examples, 2.5 parts of an ethyl acetate solution (solid content=37.5%) of trimethylolpropane adduct [a reaction product of aromatic diisocyanate compounds and 1-hydroxy-2,2-di(hydroxymethyl)-n-butane], an aromatic diisocyanate, was added to obtain a pressure sensitive adhesive composition.

Pot Life

In a 225 mL wide-mouthed glass bottle to which nitrogen gas had been blown in advance, about 70% of each of the pressure sensitive adhesive compositions was poured immediately after preparation. Then, the bottle was sealed and held in an electric oven at 40° C. The compositions were visually evaluated.

The visual evaluation was carried out by observing an abnormal appearance, particularly a generation of white and turbid insoluble components in the pressure sensitive adhesive compositions. The time when even a slight abnormality was observed after the addition of trimethylolpropane adduct was determined as a pot life.

Evaluations of Physical Properties

Each of the pressure sensitive adhesive compositions was coated on a commercially available releasing paper at a dry thickness of 25 g/m$^2$, by a test coater, and dried in an electric oven at 100° C. for 2 minutes to remove the solvent. Then, a PET film (50 μm) was laminated thereon and the whole was wound up to obtain an adhesive sheet. The adhesive sheet was allowed to stand at 23° C. and 50% RH for 7 days to obtain a sample for testing the following physical properties, i.e., adhesive strength, holding power, and tack.

Adhesive Strength

The releasing paper was removed from the adhesive sheet sample (10 cm×25 mm), and a layer of the pressure sensitive adhesive composition was adhered to a polished stainless steel plate (SUS plate) or a polyethylene plate (PE plate), and pressed by once reciprocating a 2 kg roll thereon. After allowing to stand at 23° C. and 50% RH for 24 hours, a 180° peel strength was measured by a tensile testing machine.

Holding Power

The releasing paper was removed from the adhesive sheet sample (10 cm×25 mm), and a layer of the pressure sensitive adhesive composition was adhered to a polished stainless steel plate over an area of 25 mm×25 mm, and pressed by once reciprocating a 2 kg roll thereon. A load of 1 kg was applied at 40° C., and a distance (mm) between the initially adhered position and the adhered position after 70000 seconds was determined.

Tack

Tack was measured in accordance with JIS Z 0237, i.e., using an inclined ball tack.

Method for Measuring Formaldehyde

In a glass bottle having a volume of 800 to 1000 mL, 4 mL of distilled water was poured in advance. The releasing paper was removed from the adhesive sheet sample (20 cm×10 cm) as used in the tests for evaluating the above properties. A test sample composed of a PET film and a layer of the pressure sensitive adhesive composition was dipped into the distilled water, and allowed to stand at 90° C. for 2 hours, during which formaldehyde was adsorbed in the distilled water. A concentration of formaldehyde in the resulting test solution was measured in accordance with an acetyl acetone method, by colorimetry using a photoelectric spectrophotometer or a photoelectric calorimeter.

TABLE 1

| | | Examples | | | | Comparative Examples | | | |
| --- | --- | --- | --- | --- | --- | --- | --- | --- | --- |
| | | 1 | 2 | 3 | 4 | 1 | 2 | 3 | 4 |
| Polymerizing solvent (parts by weight) | toluene | 0 | 0 | 0 | 0 | 20 | 20 | 0 | 0 |
| | ethyl acetate | 120 | 120 | 120 | 120 | 100 | 100 | 120 | 120 |
| Chain transfer | α-pinene | 0.85 | — | — | 0.85 | 0 | 0 | 0 | 0 |

TABLE 1-continued

|  |  | Examples | | | | Comparative Examples | | | |
| --- | --- | --- | --- | --- | --- | --- | --- | --- | --- |
|  |  | 1 | 2 | 3 | 4 | 1 | 2 | 3 | 4 |
| agent | limonene | — | 0.8 | — | — |  |  |  |  |
| (parts by weight) | terpinolene | — | — | 0.025 | — |  |  |  |  |
| moisture trapping agent (parts by weight) | benzoyl chloride | 0 | 0 | 0 | 0 | 0.01 | 0 | 0.01 | 0 |
| Acetylacetone (parts by weight) |  | 0.1 | 0.1 | 0.1 | 0 | 0 | 0 | 0 | 0 |
| Enviromental | toluene | No | No | No | No | Yes | No | No | No |
| suitability | halogen compound | No | No | No | No | Yes | No | Yes | No |
|  | formaldehyde | Not detected | | | 0.38 µg/g | 0.38 µg/g | | | |
| Pot time (hr) | stored at 40° C. | 4 | 4 | 4 | 4 | 4 | 2> | 4 | 4 |
| Physical properties |  |  |  |  |  |  |  |  |  |
| Adhesive strength (N/25 mm) | against SUS plate | 18.8 | 18.5 | 18.7 | 18.1 | 18.2 | 13.8 | 12.4 | 13.3 |
|  | against PE plate | 8.0 | 7.7 | 8.2 | 8.1 | 7.9 | 6.9 | 6.4 | 6.7 |
| Holding power (shear) | 40° C.-1 Kg load, after 70000 seconds | 0.5 mm | 0.4 mm | 0.6 mm | 0.3 mm | 0.7 mm | 0.2 mm | 0.1 mm | 0.6 mm |
| Ball tack |  | 6 | 6 | 6 | 6 | 6 | 4 | 3–4 | 6 |

As shown in Table 1, the pressure sensitive adhesive composition of Comparative Example 1 has a long pot life, and good physical properties, but contains toluene and a halogen compound, and releases formaldehyde from the adhesive sheet.

The pressure sensitive adhesive composition of Comparative Example 2 does not contain a halogen compound, but has a short pot life of less than 2 hours, and the physical properties of the adhesive sheet are lower.

The pressure sensitive adhesive composition of Comparative Example 3 does not contain toluene, but the copolymers as the base component of the pressure sensitive adhesive composition have a large weight average molecular weight because α-pinene or the like was not used when polymerized, and thus, the physical properties of the adhesive sheet are remarkably lower.

The pressure sensitive adhesive composition of Comparative Example 4 does not contain toluene, but contains only ethyl acetate, and thus has a sufficient pot life even without a halogen compound. However, the copolymers as the base component of the pressure sensitive adhesive composition have a large weight average molecular weight because α-pinene or the like was not used when it was polymerized, and thus, the physical properties of the adhesive sheet are remarkably lower, and formaldehyde is released from the adhesive sheet.

On the contrary, each of the pressure sensitive adhesive compositions of Examples 1 to 4 has a sufficient pot life, exhibits sufficient physical properties in the adhesive sheet, and does not contain substances causing environmental deterioration, or can inhibit or reduce the release of such substances if contained.

As above, the present invention was explained with reference to particular embodiments, but modifications and improvements obvious to those skilled in the art are included in the scope of the present invention.

The invention claimed is:

1. A pressure sensitive adhesive composition comprising a copolymer having a weight average molecular weight of 400 to 900 thousand and an isocyanate compound, but said composition not containing a halogen compound, said copolymer being prepared in the absence of toluene by copolymerizing radical-polymerizable monomers essentially containing a radical-polymerizable monomer with a carboxyl group, using at least one chain transfer agent selected from a group consisting of α-pinene, limonene, and terpinolene, in the presence of at least one organic solvent selected from a group consisting of ethyl acetate, acetone, methyl ethyl ketone, and methyl isobutyl ketone.

2. The pressure sensitive adhesive composition according to claim 1, wherein 0.001 to 5.0 parts by weight of said chain transfer agent is used with respect to 100 parts by weight of said radical-polymerizable monomers to prepare said polymer.

3. The pressure sensitive adhesive composition according to claim 1, further comprising acetyl acetone.

4. A pressure sensitive adhesive sheet comprising a substrate carrying on at least one surface thereof a layer of the pressure sensitive adhesive composition according to claim 1.

* * * * *